United States Patent

Abramson et al.

[15] 3,686,576

[45] Aug. 22, 1972

[54] PARALLEL TONE DETECTOR

[72] Inventors: Paul Abramson, Raleigh, N.C.; Gerald Goertzel, White Plains, N.Y.

[73] Assignee: International Business Machines Corporation, Armonk, N.Y.

[22] Filed: Dec. 18, 1970

[21] Appl. No.: 99,383

[52] U.S. Cl. ....................328/134, 328/109, 328/110

[51] Int. Cl. ..............................................H03b 13/04

[58] Field of Search................328/63, 134, 109, 110; 307/233

[56] References Cited

UNITED STATES PATENTS

| | | | |
|---|---|---|---|
| 3,189,835 | 6/1965 | Marsh | 328/63 |
| 3,219,935 | 11/1965 | Katakami | 328/134 X |
| 3,354,398 | 11/1967 | Broadhead | 307/233 X |
| 3,501,701 | 3/1970 | Reid | 328/134 |
| 3,576,532 | 4/1971 | Kads | 328/134 X |

*Primary Examiner*—John S. Heyman
*Attorney*—Hanifin and Jancin and Graham S. Jones, II

[57] ABSTRACT

A parallel tone detection method, system and apparatus includes using several generators for providing square waves at the fundamental frequency of several parallel tones to be detected. An unknown input signal is clipped and then AND gates are used to test for the simultaneous presence of the A.C. polarities of both the unknown input signal and each respective square wave. A low-pass filter is connected to each of the outputs of the AND gates associated with each tone. The outputs of the filters for each tone are connected into a corresponding analogue OR gate, which is one of a series of analogue OR gates. Then it is determined whether the outputs of any of the analogue OR gates exceeds a standard value. If it does then a circuit determines which analogue OR gate produces the largest output to identify the tone received.

14 Claims, 14 Drawing Figures

INVENTORS
PAUL ABRAMSON
GERALD GOERTZEL
BY Graham S. Jones, II
ATTORNEY

PARALLEL TONE DETECTOR

BACKGROUND OF THE INVENTION

1. Field Of The Invention

This invention relates to signal analysis and, in a particular aspect thereof, to detection of parallel audio tones.

In parallel tone transmission, two or more audio tones at a time are transmitted simultaneously over a voice channel, usually a telephone line, including one tone from an A set of tones and one tone from a B set of tones. Push-button audio tone "dialing" telephones and data transmission systems use parallel tone transmission over telephone grade transmission media.

The type of parallel tone system being considered in connection with this embodiment consists of transmitting two tones simultaneously, each from a set of four tones. The sets of tones referred to are identified as A—1, 697hz; A—2, 770hz; A—3, 852hz; A—4, 941hz; B—1, 1,209hz; B—2, 1,336hz; B—3, 1,477hz and B—4, 1,633hz. This two-tone composite signal provides 16 possible code combinations of one of each set at a time.

2. Description of the Prior Art

A problem when receiving such a composite signal containing two frequencies A—m, B—n, (where *m* and *n* equal 1, 3 or 4 respectively) is to determine which of the tones in each set had been transmitted. The method used by the telephone industry is to use a separate tuned circuit for each tone. Such a detector is expensive.

SUMMARY OF THE INVENTION

The set of potential frequencies of the unknown two-tone composite signal is known a priori. It is an object of this invention to make use of this information to provide a simpler and more economical means of identifying the components of the unknown composite signal.

Another object of this invention is to avoid as much as possible the use of analogue circuitry such as tuned circuits and to use digital logical AND and OR gates instead, when practical.

A further object of this invention is to share hardware to provide an economical system.

It is also desired to limit the quantity of any precision devices required to detect sets of predetermined parallel tones or sinusoidal signals.

In accordance with this invention, a method, system, and apparatus are provided for detection of parallel A and B tones, preferably audio tones, preferably for a large number of receivers by sharing of equipment. First an unknown audio A—B signal is amplified and clipped to produce a squared signal. A squared signal is defined herein as shown by the output in FIG. 3 given the input shown thereby. Also, separate oscillators at four times the frequencies of several frequencies, preferably $A_1$, $A_2$, $A_3$, $A_4$ and $B_1$, $B_2$, $B_3$, and $B_4$ parallel tone frequencies, supply a squarer which clips the waves and then sends them to digital logic which produce so called "sines," "cosines," and negative (inverted) "sines" and "cosines" of the squared waves in the sense of phase shifts of 90°, 180°, and 270°. These sines, etc. to produce 32 different square wave test or local signals at the above eight frequencies. In other words, the test or local square waves are shifted in 90° increments by amounts of 90°, 180°, and 270°, to provide four waves at each frequency including the original or 0° square wave. Actually, any number of test signals may be provided for each frequency to be identified. Each of the 32 test local signals is connected to one side of its own AND gate and the other sides of all 32 AND gates are all coupled to the squared unknown signal which consists of an A and a B signal, preferably through low and high-pass filters, respectively. Each output is connected through a low-pass filter to an analogue OR associated with the frequency to be detected such as $A_1$, $A_2$, . . . $B_4$.

The foregoing and other objects, features and advantages of the invention will be apparent from the following more particular description of the preferred embodiments of the invention as illustrated in the accompanying drawings.

DETAILED DESCRIPTION OF THE INVENTION

Figure 1:
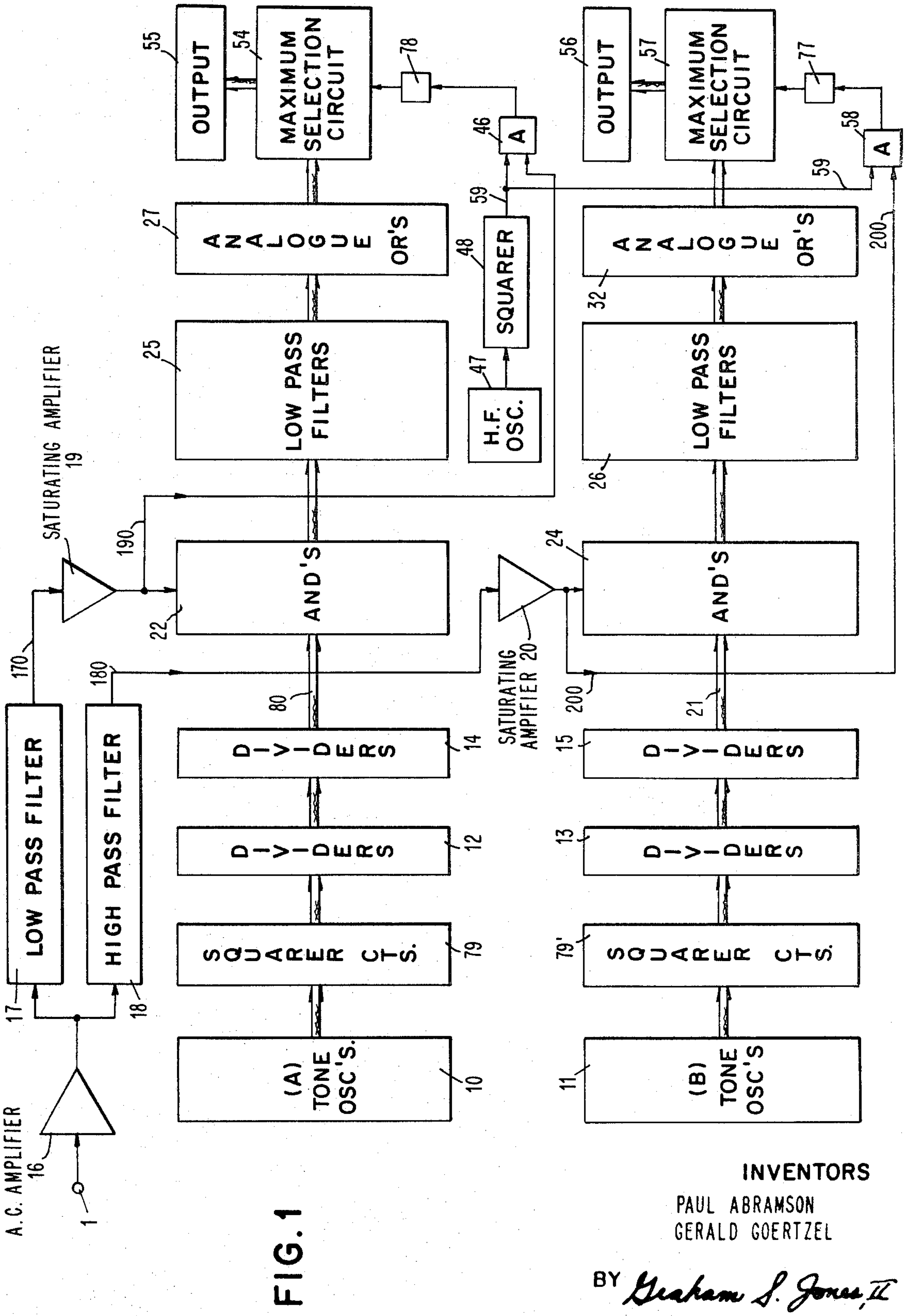
FIG. 1 is a block diagram of a system embodying this invention.

Referring to FIG. 1, a parallel tone signal to be identified may be connected to terminal 1. The signal is then amplified by A.C. amplifier 16 and is filtered in parallel by low-pass filter 17 to pass A tones and high-pass filter 18 to pass B tones. These filters have separate outputs 170 and 180 connected through saturating amplifiers 19 and 20 respectively to AND circuits 22, 24, 46 and 58. "Saturating amplifiers" is intended to refer herein to amplifiers which provide a very sharp leading edge up to a maximum amplitude for positive input signals and a sharp transition to a negative maximum amplitude or zero for negative input signals.

A set of A tone oscillators 10 and B tone oscillators 11 provide outputs at frequencies four times the frequencies of the A and B parallel tones to be detected. These A.C. or sine wave signals are coupled, through squarer circuits 79 and 79' which convert sine waves into square waves of the same frequency, to dividers 12 and 13 respectively to provide two square waves 180° out-of-phase for each tone at half the frequency. Then each of those square waves is divided again by dividers 14 and 15 respectively to provide a set of four square waves having a phase relationship of 0°, 90°, 180° and 270° for each tone. Each of those dividers has an output connected by cables 80 and 21 respectively to other inputs of the AND circuits 22 and 24 with one AND circuit for each phase of each square wave, for each tone. These frequencies are the actual values of A and B.

The output of each of the ANDs in circuits 22 and 24 is connected to a separate one of low-pass filters 25 and 26, which are connected in groups for each tone to an analogue OR 27 or 32 respectively. The ORs 27 and 32 are connected to maximum selector circuits 54 and 57 for A tones and B tones respectively, which function to determine which of the OR's 27 and which of the OR's 32 is providing the largest output above a minimum level provided by the outputs of low-pass or integrating filters 78 and 77 respectively. Those filters 78 and 77 are connected to the outputs of AND circuits 46 and 58 respectively and provide inputs to selector circuits 54 and 57 respectively to set a minimum level of detection of a signal received from the analogue ORs 27 and 32. The first inputs of AND's 46 and 58 are lines 190 and lines 200. The other inputs are from squarer circuit 48 and line 59. A high frequency oscillator 47 provides an input to the squarer 48. The output signal from squarer 48 is then ANDed with high frequency and low frequency input signals, which provide a background signal against which a comparison can be made to determine whether or not the analogue ORs 27, 32 are providing large enough signals.

THEORY BEARING ON THE INVENTION

In order to facilitate the description of the present invention, the theory related to analogue multiplication of a received parallel tone signal by a local signal is now discussed below.

Assume that a received parallel tone signals has the form which follows:

$$S=P\cos(At+\alpha)+Q\cos(Bt+\beta)$$

where $t$ is time $\alpha$ and $\beta$ are phase constants $P$ and $Q$ are amplitudes and where $A$ is one of a set of four A-tone frequencies and $B$ is one of a set of four B-tone frequencies. It is possible to determine whether a given frequency C is present by first performing cross-correlation of a test signal T, as follows $$T=R\cos(Ct+\gamma)$$

$R$ = amplitude $\gamma$ = phase constant with the received signal S. The product of T and S yields $$ST=PR/2\,[\cos((A-c)t+\alpha-\gamma)+\cos((A+C)t+\alpha+\gamma)]+QR/2\,[\cos((B-C)t+\beta-\gamma)+\cos((B+C)t+\beta+\gamma)]$$

If $C$ does not nearly match either of the signal frequencies A or $B$ then $ST$ will be attenuated greatly by a low-pass filter. If, on the other hand, for example, $$e=A-C<<A\ (e \text{ is very small})$$

is below the cut off frequency of the low-pass filter, then the term $$PR/2\cos(et+\alpha-\gamma)$$

will pass through the filter and indicate the presence of frequency A in the received signal. If $e$ is zero and $\alpha-\gamma=\pi/2$, this term vanishes.

As the phase of the local oscillator varies in relation to that of the corresponding frequency in the signal, the output varies sinusoidally at the difference (beat) frequency from maximum to minimum about some "no-signal" level. To assure the presence of an output above the "no signal" level when the frequency match is very good, four phases of the local oscillator have been used, with the greatest output of the four providing the desired signal. Thus, regardless of whether the local or test signal and the unknown signal are in phase, one or more of the four signals will be close enough to being in phase to provide a sufficient output signal to indicate the presence of a signal near the frequency desired.

In general, however, if the incoming A tone and B tone signal "S" is analogue multiplied by the eight possible frequencies in eight separate analogue multipliers, and then low-pass filtered, two of the outputs should be sinusoidal of relatively low frequency and of substantial amplitude while the other six should be of a much higher frequency and, therefore, of very small amplitude because of the low-pass filter. Thus, it is possible to identify the components of the received composite signal.

The above method of identifying the unknown components of the received composite signal thus makes use of the a priori knowledge of the possible set of frequencies which may be used. In the method described above, eight "T" signals would have to be provided locally. The above scheme of comparing the incoming signal against a set of locally generated frequencies, forms the background of the present invention. The analogue multipliers can be replaced by digital logic in the manner explained below.

If the signal ST were to be half-wave rectified, amplified and clipped to provide a square wave signal D(ST) with the properties $$D(ST)=1 \quad \text{when } ST>0$$

Figure 5:
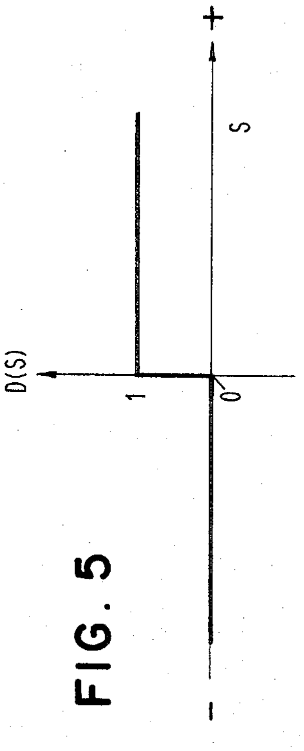
FIG. 5 shows a square wave amplitude D(S) as function of the amplitude of the input amplitude of the signal S.

$D(ST)=$ when $ST<0$ then $D(ST)$ would have, in addition to the terms in $ST$, a $DC$ component and the terms arising from combining the frequencies in $ST$ three at a time, five at a time, etc. Thus, after passing through a low-pass filter, $D(ST)$ and ST will contain nearly the same information — primarily the term $(PR/2)\cos(et+\alpha-\gamma)$ and its odd harmonics. See FIG. 5, which shows the related function $D(S)$ as a function of $S$ so that when S is greater than zero $D(S)=1$. There is also a related function $D(T)$, which may be 0 or 1 which would look similar to FIG. 5.

$D(ST)$ is unity if both $S$ and $T$ are positive or both are negative. Thus, we have $$D(ST)=[D(S)\text{ AND }D(T)]\text{ OR }[D(-S)\text{ AND }D(-T)]$$

It may also be noted that $D(S)$ AND $D(T)$ will have nearly the same average as $D(-S)$ AND $D(-T)$. AND and OR, as used herein, are the logical operations.

Note that $D(S)$ AND $D(T)$ is unity when $S$ and $T$ are both positive. Not also that passing through a low-pass filter provides an output whose amplitude corresponds to evaluating the fraction of the time that this is true. Similarly, the other term ($D(-S)$ AND $D(-T)$), after passage through the low-pass filter provides an output which corresponds to the fraction of the time that both signals are simultaneously negative. If the signals are nearly symmetrical, each of the terms will have the same average.

That the average of $D(ST)$ is the sum of these two averages follows from the fact that the two terms cannot be true simultaneously. Hence, we may restrict ourselves to only one of these terms, and ignore the other, which provides only redundant information.

What we have shown above is that, except for a distortion of the signal at the beat frequency, the equivalent of analogue cross-correlation detection may be obtained by logical circuitry (by squaring signals and using AND gates in place of multipliers), plus an averaging circuit (such as a simple low-pass filter).

To summarize, to find if a frequency C is present in a signal S, one may evaluate the average value of $D(S)$ AND $D(T)$ (pass them through a low-pass filter) and check for the presence of a signal at the beat frequency.

Figures 2, 2A:
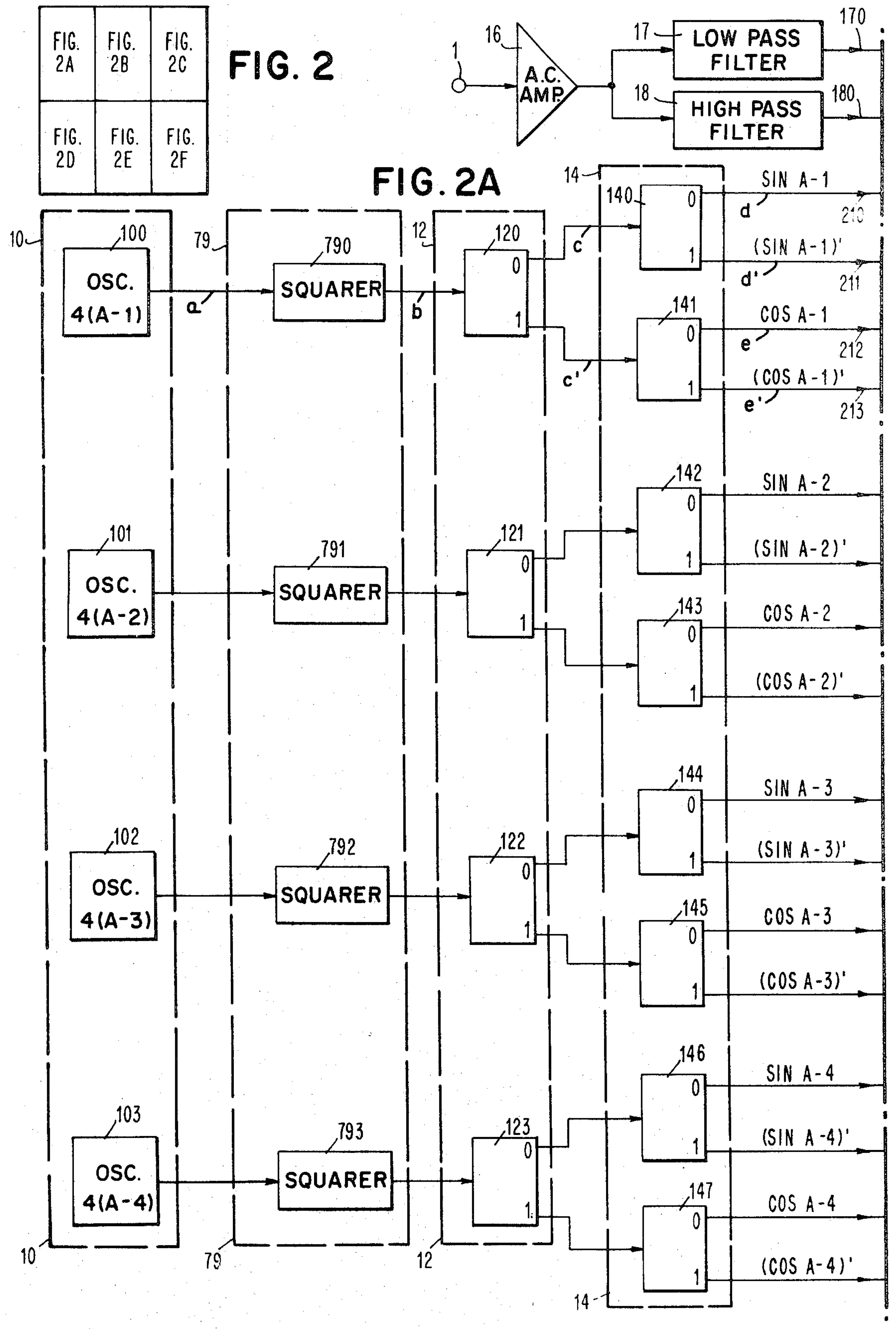
FIG. 2 shows the arrangement of FIGS. 2A–2F, which show the system of FIG. 1 in greater detail.
Figure 2B:
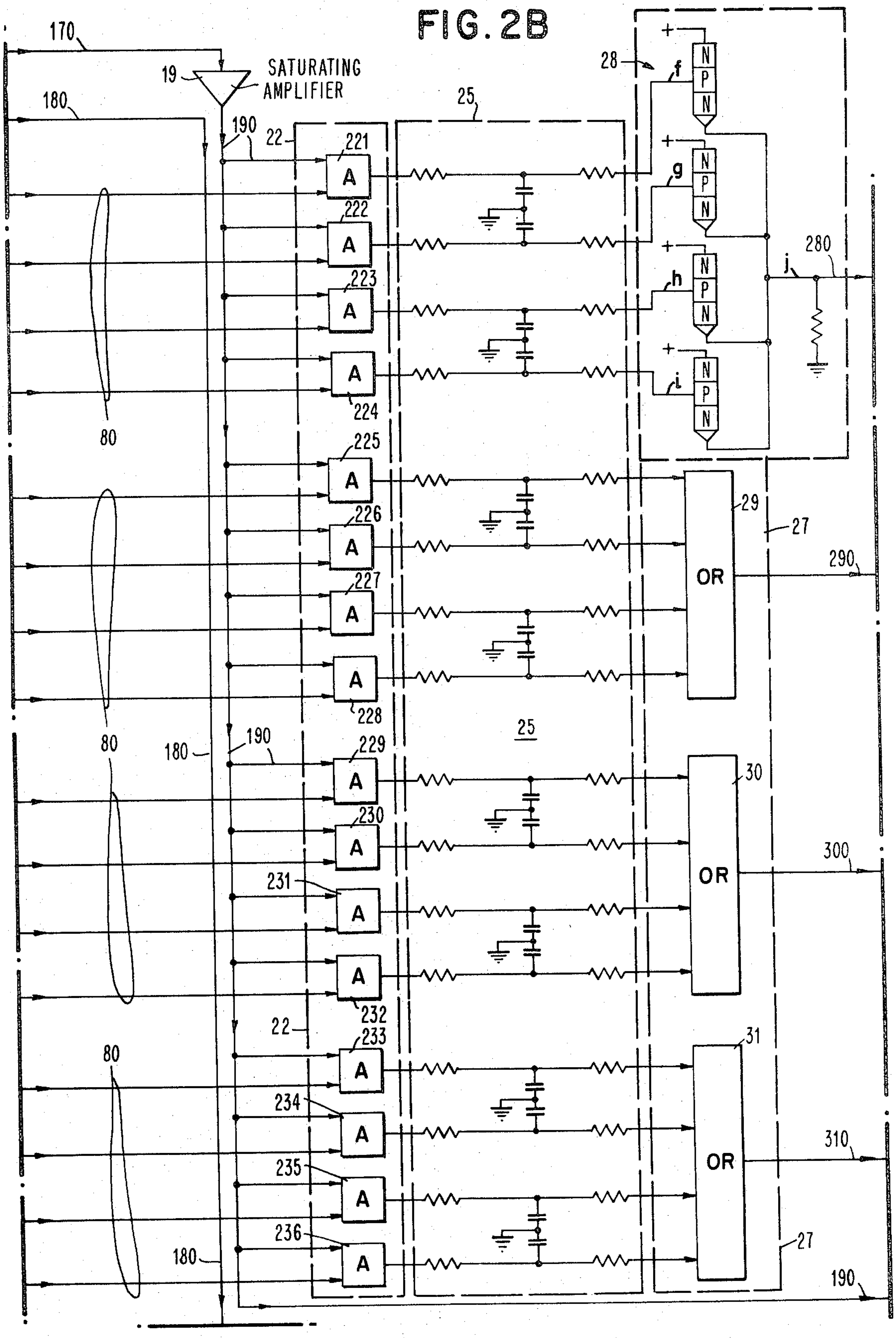
Figures 7A, 7B:
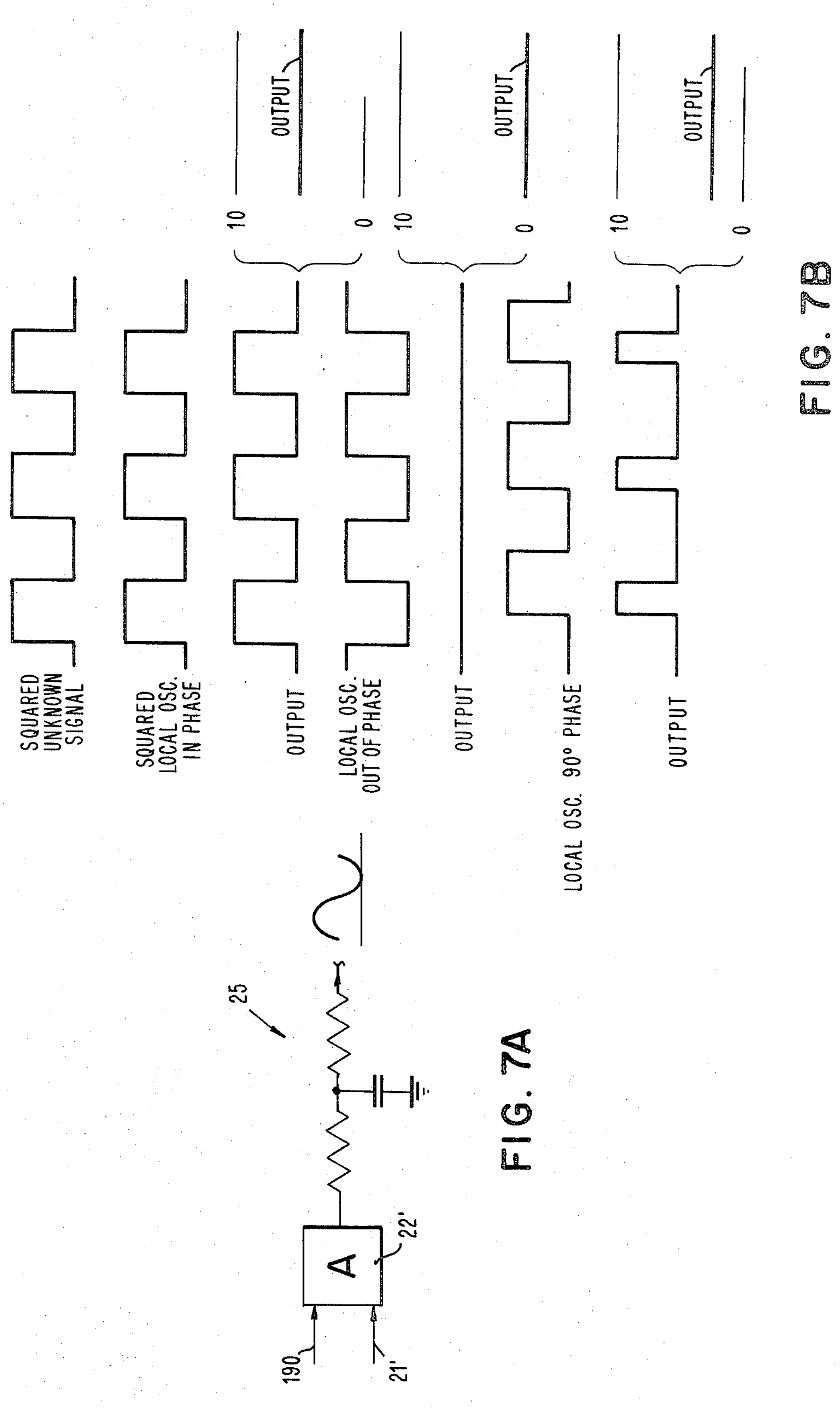
FIG. 7A shows an AND gate and a low-pass filter from FIG. 2B
FIG. 7B shows signal waveforms representing the relationship between some of the possible inputs and outputs of the circuit of FIG. 7A. This Figure shows the case where the unknown frequency is equal to the local oscillator frequencies.

In order to implement this cross-correlation detector system, the eight possible frequencies must be available at the receiver. These frequencies are supplied by eight local oscillators 100, 101, 102, 103 and 110, 111, 112, 113 in A tone oscillators 10 and B tone oscillators 11, respectively. As was briefly mentioned earlier, each of the local oscillators must supply four phases. FIG. 7B shows some of the results of ANDing (in place of multiplying) the four phases of one oscillator with D (S) which is the squared unknown signal on line 190. The outputs of AND gates 22' are low-pass filtered by a simple filter circuit 25. This is adapted to be applied as shown in FIG. 2B to a four input OR circuit 27, such as circuit 28. The output of one of the filter circuits 25 is the beat frequency shown in FIG. 43 while the output 280, 290, 300 or 310 of a corresponding OR circuit 27 has a high D.C. level only if the incoming signal contains the particular frequency of the corresponding local oscillator 10 as shown in FIG. 7B. FiG. 2B shows the same logical system applied to the entire A set of frequencies. The D.C. level at the output of an OR circuit 27 in FIG. 2B will be higher for one of the four outputs, and lower for the other three. A similar set of circuits is used for the "B" frequencies to identify the particular B tone in the composite signal.

It should be noted that the hardware which is required to generate the eight local frequencies and the four phases of each frequency can be shared by as many parallel tone receivers as are required at a given location. Each additional receiver is simply connected to the 32 local A and B signal sources having output lines 80 and 21 respectively. In addition, the only precision components required are the eight basic oscillators 10 and 11 whose frequencies should be accurate to about ± 0.1 percent. The required accuracy is a function of the received unknown frequencies. The combined inaccuracy of the received unknown frequencies and the local oscillators should be less than ≠ 2 percent. Since these are shared by all of the receivers, the cost of precision components per receiver is kept very low.

An advantage to this system is the fact that no AGC amplifier is needed. The incoming analogue signal is converted to D(S) which is essentially a binary signal. The actual amplitude of the incoming analogue signal is, therefore, unimportant provided it is at least sufficient to operate the saturating amplifiers 19 and 20.

Referring to FIGS. 1 and 2A—2F, a plurality of A tone oscillators 10 including an oscillator 100 at 2,788hz (four times the frequency A—1), an oscillator 101 at 3,080hz (four times the frequency A—2), an oscillator 102 at 3,408hz (four times the frequency of A—3), and finally, an oscillator 103 at 3,764hz (four times the frequency A—4), provide the four A tones at a frequency of four times the frequency of the A tones of a standard parallel tone telephone signalling system. These inputs are squared in respective squarer circuits 79, including individual circuits 790, 791, 792 and 793 which are coupled to individual dividers (or divide-by-two counters) 12 including circuits 120—123, each of which connects by its two opposing outputs to a pair of dividers such as divider 120 being connected to dividers 140 and 141. Divider 121 is connected to dividers 142 and 143. Divider 122 is connected to dividers 144 and 145 and divider 123 is connected to dividers 146 and 147.

Figure 6:
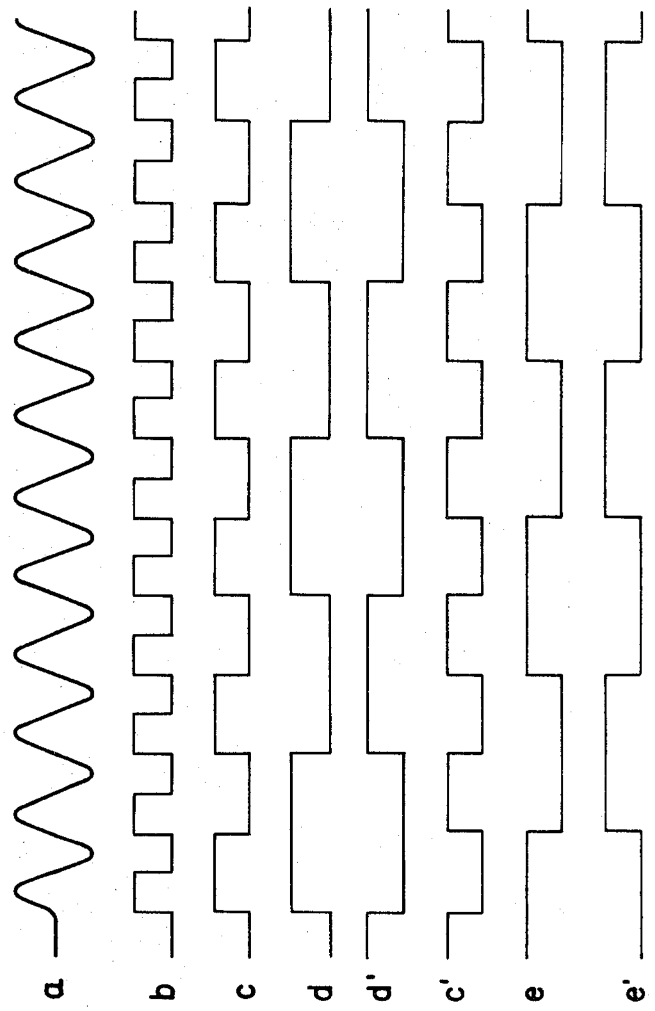
FIG. 6 shows the phase relationship of outputs of a plurality of elements in FIG. 2A.

It will be noted that at the outputs, the sines and cosines and inverses of the sines and cosines are shown on the output lines 210, 211, 212 and 213 respectively of the dividers 140 and 141. Actually, the output waves provided are square waves as shown by *d, d', e,* and *e' in FIG. 6. The waves c* and *c'* in FIG. 6 are the two opposing output waveforms of the divider 120. Waveform a is the output of the oscillator 100 connected to squarer 79 and b is the output waveform in FIGS. 2A and 2D from the squarer 79. The references to sines and cosines, etc., in FIGS. 2A and 2D are made simply for the purpose of indicating the relative 90°, 180°, and 270° phase relationships between the waves which may be seen with reference to FIG. 6, in which *d*, which is the sine, is 180° out of phase with *d'*; and *e*, which is the cosine, is 270° lagging-in phase with respect to *d*. Waveform *e' is* 180° out of phase with *e* and lags d by 90°.

Lines 80 connect to the AND gates 22 which include one AND gate for each of the sixteen outputs of the double output dividers 14. Thus, for dividers 140 and 141, AND gates 221–224 are provided. Each of the AND gates 22 has a second input which is connected to a line 190 from a saturating amplifier 19. The saturating amplifier 19 has its input connected via line 170 to the output of a low-pass filter 17 which is connected to an A.C. amplifier 16 which is intended to receive a parallel tone signal at its input line 1. The filter 17 is optional in the sense that the system will function without it.

Figure 3:
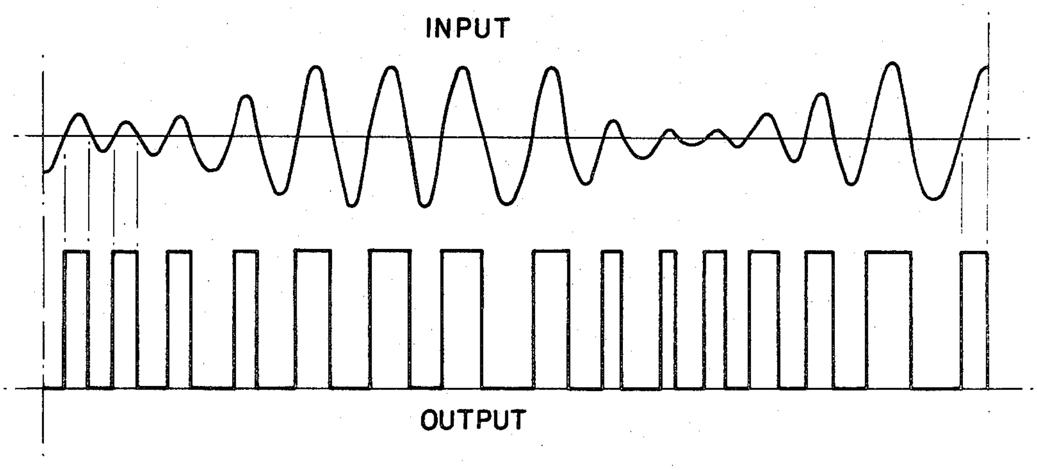
FIG. 3 shows an input signal as a function of time prior to application to a saturating amplifier which provides a square wave output, as shown on the lower waveform.

The output of amplifier 16 is also connected through an high-pass filter 18 and a line 180 to saturating amplifier 20, which is connected to sixteen AND gates 24, which are provided for the B tones, B–1, B–2, B–3, B–4, which will be discussed in greater detail below. Filter 18 is also an optional feature of the system. If the low-pass filter 17 provides an output to the saturating amplifier 19, the amplifier 19 will square the wave provided and will produce positive signals to the input of the AND gates 22 changing the input wave as shown in FIG. 3, which shows typical input and output waveforms for the saturating amplifier.

Figure 4:
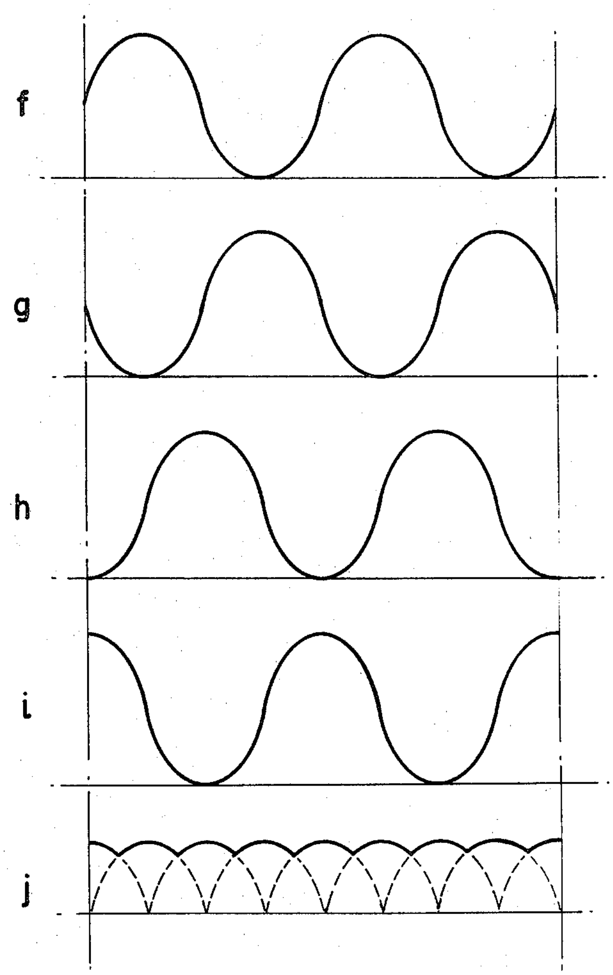
FIG. 4 shows a plurality of sine waves provided at the outputs of several low-pass filters shown in FIG. 2B.

When the amplifier 19 and the corresponding divider 14 each provide a positive input to any one AND gate 22, then an output will be provided from that AND gate 22 to the corresponding low-pass filter 25. Each of the AND gates 22 has a low-pass filter 25 connected to it. A low-pass filter 25 serves the purpose of providing integration or yielding a steady state or D.C. signal indicative of the percentage of the time that the corresponding AND gate 22 is on. This will vary as a function of the similarity of frequencies of the unknown and local signals and is a triangular function of amplitude versus phase shift between those signals. The signal provided from the output of the filter 25 will be a sinusoidal wave whose frequency will be the heterodyne between the incoming unknown signal and the signal from the local oscillator with its lower trough at 0 potential relative to ground as in FIG. 7A. Thus, if the AND gate is turned on a substantial portion of the time, a sine wave with a proportionally higher amplitude voltage will be provided at the output of the filter 25. FIG. 4 shows the output of analogue OR circuit 28 on FIG. 2B for the case where the incoming frequency is closely matched to the local oscillator. In this event, a D.C. signal as in FIG. 4, will be produced by the analogue OR circuit. This signal will be provided on one of the output lines 280, 290, 300 or 310 to the maximum selection circuit 54. Maximum selection circuit 54 will determine which of the four different outputs is largest, and this will indicate which one of the A tones has been selected in the output circuits 55. Before describing the maximum detector circuit 54, reference will be made to the oscillators 11 and the circuits connected to them.

The oscillators 11 include one providing a tone of 4,836hz (four times the B–1 frequency at oscillator 110), an oscillator 111 at 5,344hz, (four times the frequency of tone B—2), an oscillator 112 at 5,908hz, (four times the frequency of tone B—3), and a fourth oscillator 113 at 6,532hz, (four times the frequency of tone B—4). Each of these oscillators is connected to a squaring circuit 79, including individual circuits 794, 795, 796 and 797. They transform each of the sinusoidal waves into a square wave the same fundamental frequency. Similarly, the B tone dividers 13, which include circuits 130, 131, 132, and 133, are connected with their two outputs each to a pair of dividers 15, such as dividers 150 and 151 being connected to divider 130, dividers 152 and 153 connected to divider 131, dividers 154 and 155 connected to divider 132 and finally, dividers 156 and 157 connected to divider 133. The 16 outputs of the dividers 15 are connected via lines 21 to corresponding AND gate circuit 24, which includes AND gates 240 to 255, each of which is connected through its corresponding low-pass filter 26 to the four analogue-Or circuits 32, which include OR 33, for tone B—1, OR 34, for tone B—2, OR 35 for tone B—3 and OR 36 for tone B—4. Each of the ORs 32 is connected to its corresponding output line with OR 33 connected through line 330, OR 34 connected through line 240, OR 35 connected through line 350 and OR 36 connected through line 360 to the inputs to the maximum selection circuits 57, which are connected to an output circuit 56. The maximum selection circuits 57 determine which of the signals on the lines 330, 340, 350 and 360 is the largest or exceeds any standard signal provided from AND gate 58.

Figure 2C:
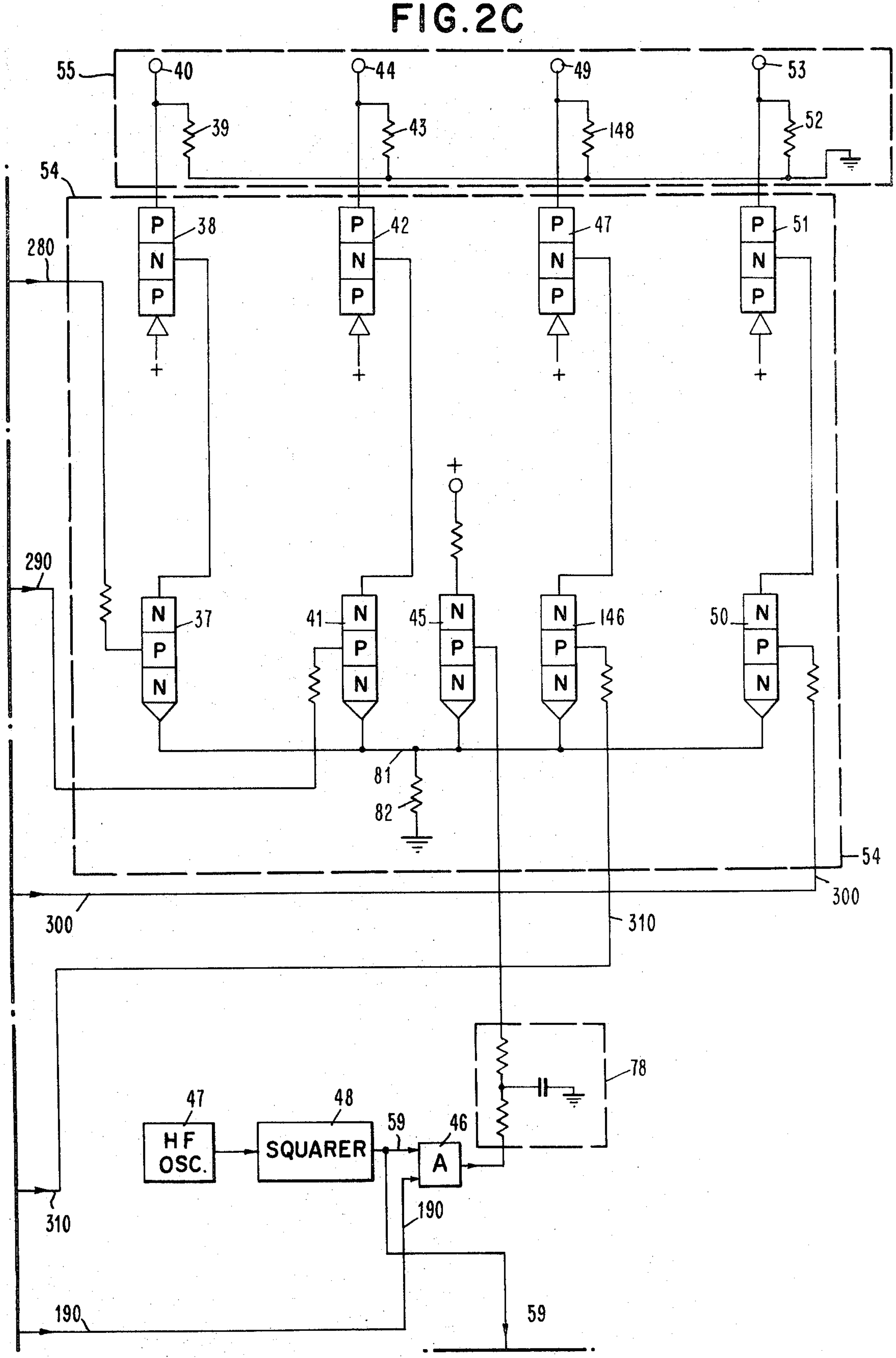
Figure 2D:
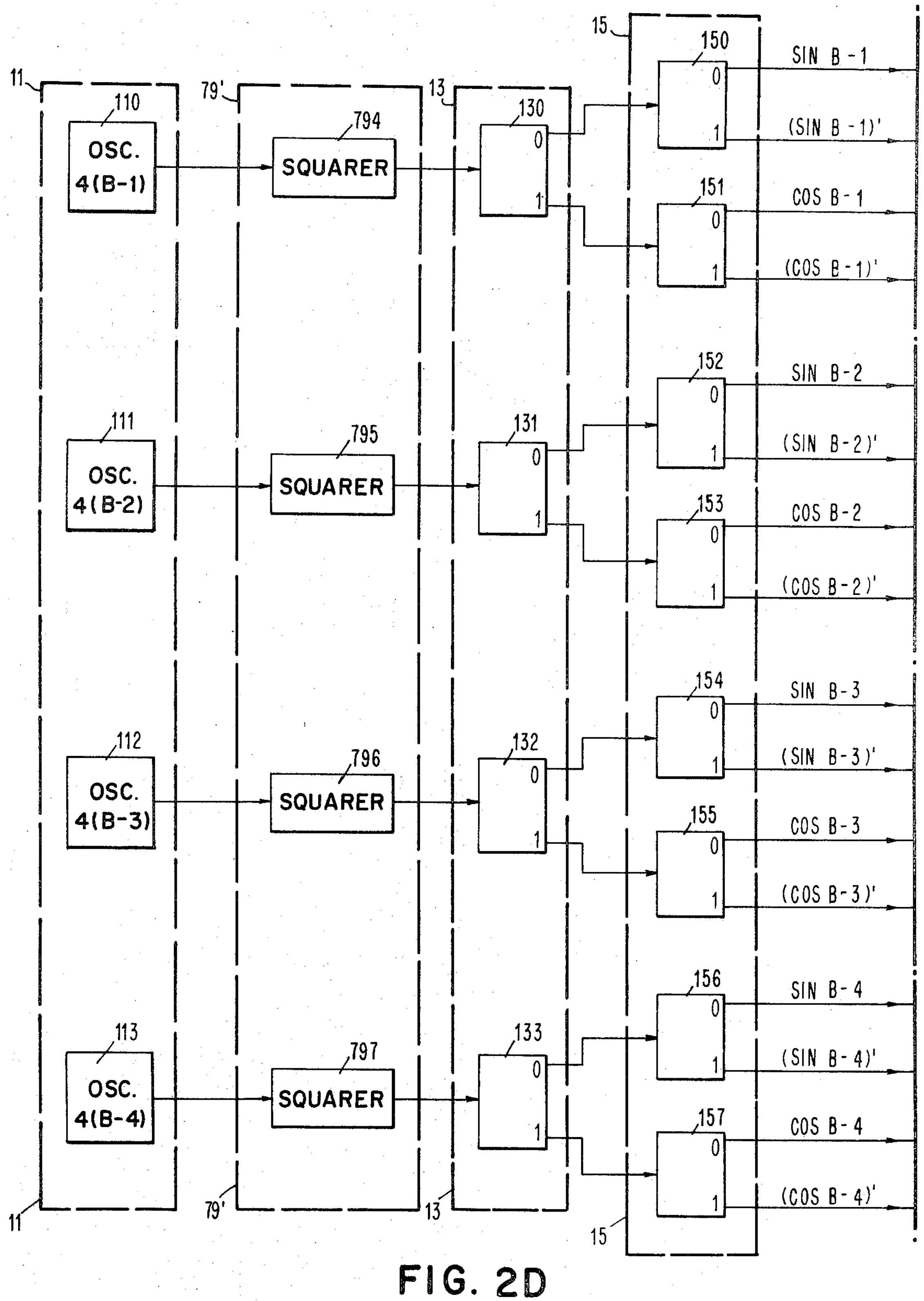
Figure 2E:
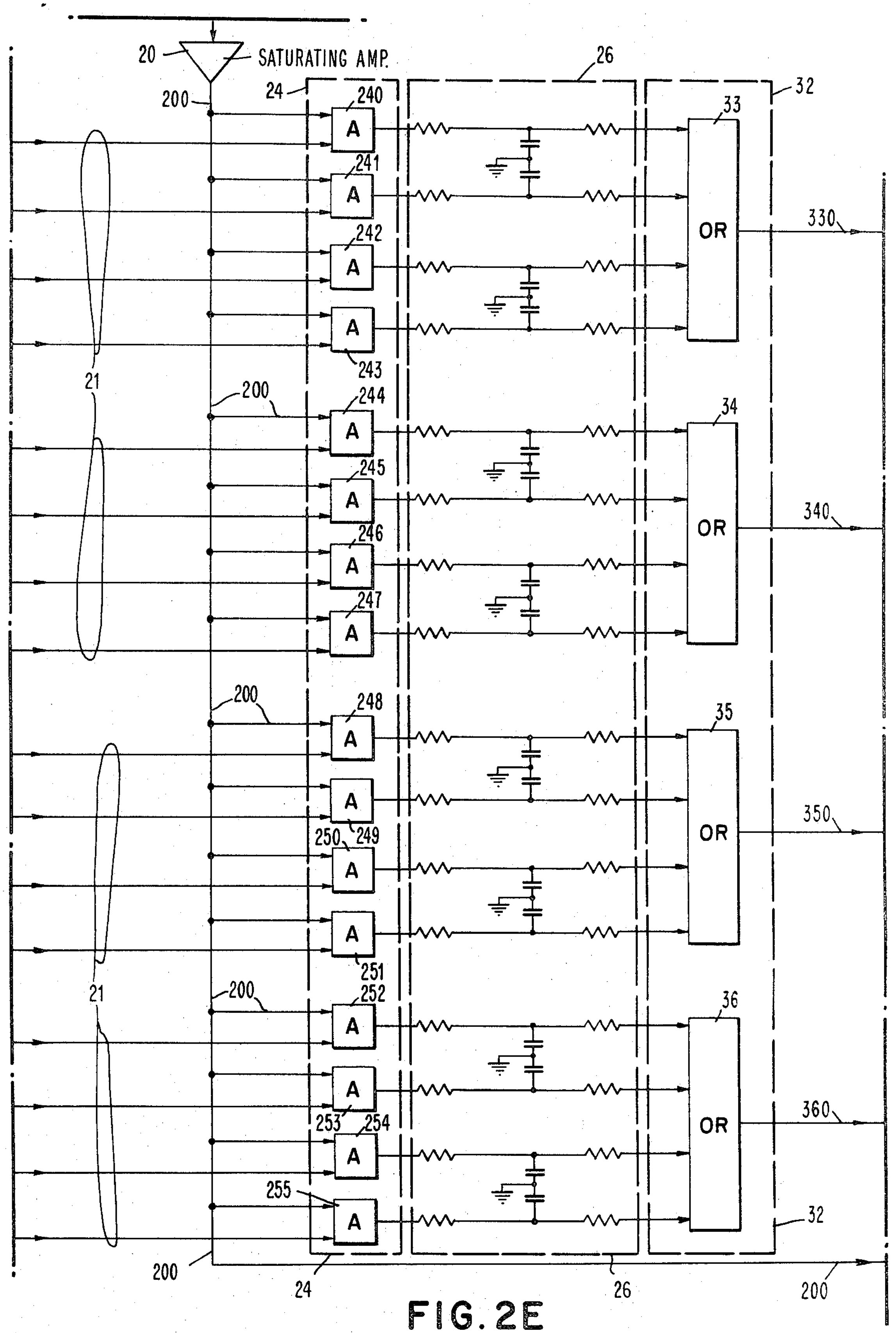
Figure 2F:
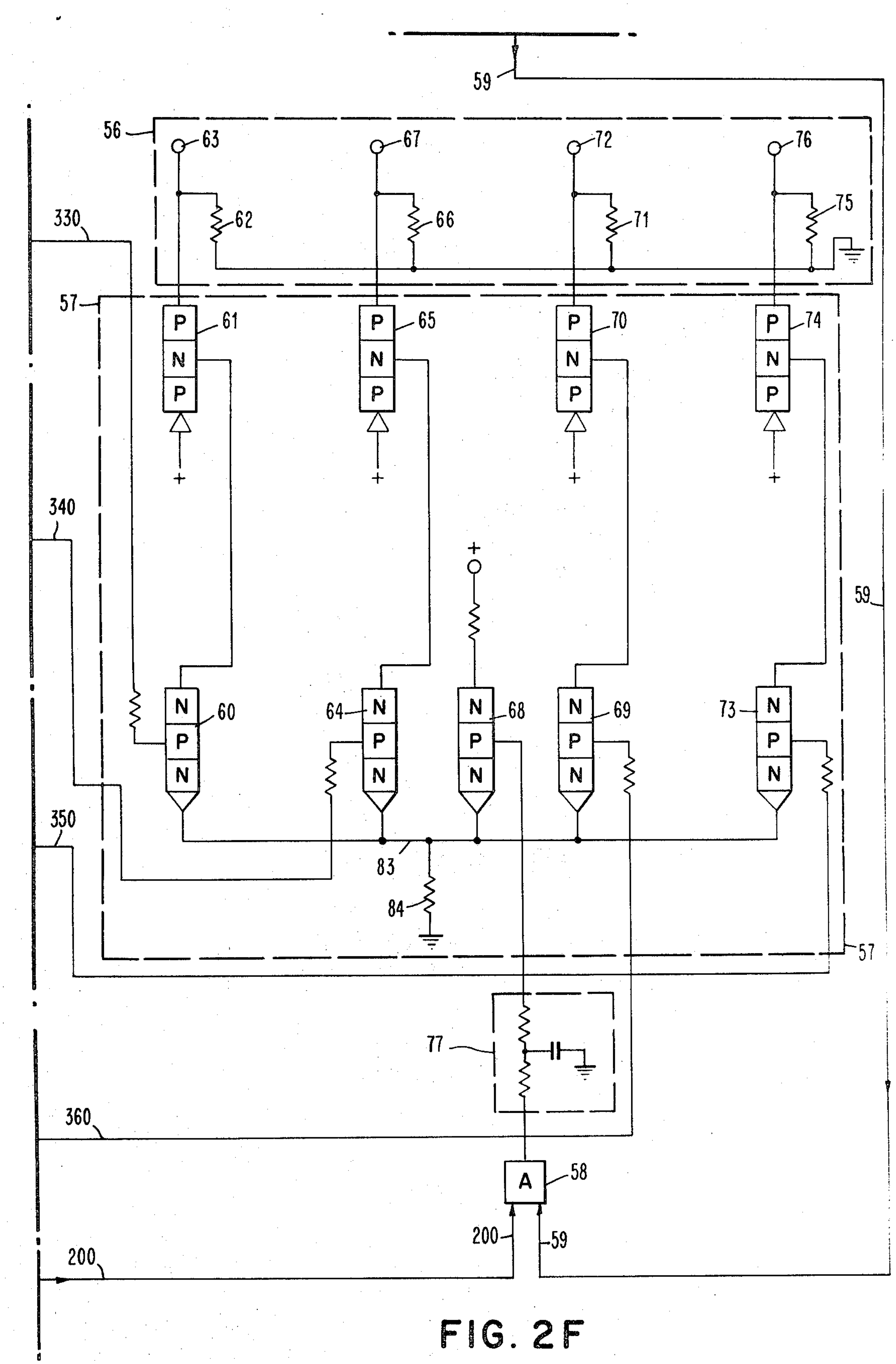

Referring to the maximum selector circuits 54 in FIG. 2C, the lines 280, 290, 300 and 310 from the ORs 27, are connected to the bases of transistors 37, 41, 146, and 50 through small resistors. The base of a reference transistor 45 is connected to the output of an AND gate 46 through a filter circuit 78. The AND gate 46 compares the squared output of a high-frequency oscillator 47 passing through a squarer 48 with the output of the low-pass filter 170 and the saturating amplifier 19 via line 190. The output of the filter 78 from the AND gate 46, is employed to provide a biasing potential at point 81 by means of the emitter follower resistor 82. If the potential at the base of reference transistor 45 exceeds the potential on the bases of the other transistors 37, 41, 146 and 50, then all those transistors will be backbiased by the emitter follower resistor 82. However, when the potential of any one of those transistors 37, 41, 146 and 50 exceeds a potential sufficient to turn it one, then it will begin to conduct, thereby turning on its corresponding one of the transistors 38, 42, 47, and 51, to which it is connected. Each of transistors 38, 42, 47 and 51 is connected to an output resistor 39, 43, 148 and 52 respectively and to a respective output line 40, 44, 49 and 53 of output unit 55.

The operation of maximum selector circuit 57 is entirely analogous to the operation of circuits 54. Transistors 60, 64, 68, 69 and 73 correspond to transistors 37, 41, 54, 146 and 50. The AND gate 58 is connected to the line 59 from squarer 48, to the output of the high-pass filter 18, via line 180 passed through the saturating amplifier 20 and line 200. This supplies the reference standard for the B tone selector circuits. The outputs of transistors 60, 64, 69 and respectively are in their collector circuits which are connected respectively to the bases of transistors 61, 65, 70 and 74 whose collectors are connected to load resistors and outputs 62, 63; 66, 67; 71, 72; and 75, 76 respectively in output 56.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of detecting s signal of a predetermined frequency including:

converting an unknown signal into a corresponding square wave signal, providing a test signal comprising a substantially square wave having a fundamental frequency near said predetermined frequency, comparing said corresponding signal with said test signal, measuring the proportion of time said test signal and said corresponding signal are substantially in phase, comparing said proportion of time with a standard value representative of a minimum proportion of time for an unknown signal and a test signal to be in phase, and indicating detection of said predetermined frequency when said proportion of time exceeds said standard value.

2. A method in accordance with claim 1 wherein measuring the proportion of time involves the step of testing for simultaneous presence of two conditions digitally as a function of time and then integrating the result of said testing.

3. A method of detecting an input signal of a predetermined frequency including:

providing a test signal having a frequency near said predetermined frequency, measuring the proportion of time said test signal and said input signal are both of predetermined relative polarities, comparing said proportion of time with a standard value representative of a minimum proportion of time for an unknown signal and a test signal to be in phase, and indicating detection when said proportion of time exceeds said standard value.

4. Apparatus for detecting an input signal of a predetermined frequency including:

first means for converting said input signal into a corresponding square wave signal, second means for providing a substantially square wave test signal having a fundamental frequency near said predetermined frequency, third means coupled to receive outputs of said first and second means for measuring and indicating the proportion of time said test signal and said corresponding square wave signal are substantially in a predetermined phase relationship, fourth means for providing a standard value representative of a minimum proportion of time for an unknown signal and a test signal to be in phase, and fifth means connected to the output of said third and fourth means for comparing said proportion of time with said standard value.

5. Apparatus in accordance with claim 4 wherein said means for measuring the proportion of time includes means for testing for simultaneous presence of two conditions digitally as a function of time and means for integrating the result of said testing connected to the output of said means for testing.

6. Apparatus for detecting a sinusoidal signal of a predetermined frequency including:

first means for providing a test signal having a frequency near said predetermined frequency, second means for providing an output indicative of the proportion of time that said test signal and an unknown signal are both positive and both negative relative to an alternating current reference level, and third means for comparing said proportion of time with a standard value representative of a minimum proportion of time for an unknown signal and a test signal to be in phase, said second means being coupled to receive said test signal from said first means, said third means being coupled to receive said output from said second means.

7. A method of detecting an input signal whose frequency is one of a set of predetermined frequencies including:

converting said input signal into a corresponding square wave signal, providing a plurality of substantially square wave test signals, each having its fundamental frequency near one of said predetermined frequencies, measuring the proportion of time each of said test signals and said corresponding square wave signal are substantially in phase, providing a standard value representative of a minimum proportion of time for an unknown signal and a test signal to be in phase, and comparing said proportions of time with said standard value indicating that said input signal is of the frequency of the one of said test signals providing the highest measured proportion of time, if any, above said standard value.

8. A method in accordance with claim 7 wherein measuring the proportion of time involves the step of testing for simultaneous presence of two conditions digitally as a function of time, and then integrating the result of testing.

9. Apparatus for detecting an input signal whose frequency is one of a set of predetermined frequencies including:

first means for converting said input signal into a corresponding square wave signal, second means for providing a plurality of test signals comprising substantially square waves having fundamental frequencies near said predetermined frequencies, third means for measuring the proportion of time each said test signal and said corresponding square wave signal are substantially in a predetermined phase relationship, said third means being coupled to receive the outputs of said first means and said second means, fourth means for providing a standard value representative of a minimum proportion of time for an unknown signal and a test signal to be in phase, fifth means coupled to the outputs of said third and fourth means for comparing said proportions of time with a standard value.

10. Apparatus in accordance with claim 9 wherein said means for measuring the proportion of time includes means for testing for simultaneous presence of two conditions digitally as a function of time, and means for integrating the result of said testing connected to the output of said means for testing.

11. A method of detecting an input signal whose frequency is one of a set of predetermined frequencies including:

converting said input signal into a corresponding square wave signal, providing four substantially square wave test signals per predetermined frequency each having its fundamental frequency near one of said predetermined frequencies and providing four phases per frequency equally displaced from one another in frequency, measuring the proportion of time each of said test signals of each frequency and said corresponding square wave signal are substantially in phase, providing a standard value, comparing said proportion of time with said standard value and, indicating which of said test signals provided the largest proportion of time in excess of said standard value.

12. Apparatus for detecting an input signal whose frequency is one of a set of predetermined frequencies including:

first means for converting said input signal into a corresponding square wave signal, second means for providing four substantially square wave test signals per predetermined frequency each having its fundamental frequency near one of said predetermined frequencies, and providing four phases per frequency substantially equally displaced from one another in phase shift, third means coupled to said first means and said second means for measuring the proportion of time each of said test signals of each frequency and said corresponding square wave signal are substantially in a predetermined phase relationship, fourth means for providing a standard value, and fifth means coupled to said third and fourth means for comparing the largest of said proportions of time with a standard value, and indicating the identity of the frequency having said largest proportion if it exceeds said standard value.

13. A method of detecting a plurality of input signals, each of whose frequency is one of a distinct set of predetermined frequencies including:

converting the input signals into corresponding square wave signals, providing four substantially square wave test signals per predetermined frequency having fundamental frequencies near said predetermined frequencies, and providing four test signals at each said predetermined frequency substantially equally displaced from one another in phase shift, measuring the proportion of time all of said test signals of each frequency and said unknown square wave signal are substantially in phase, and comparing said proportions of time with standard values.

14. Apparatus for detecting a plurality of input signals, each of whose frequency is one of a distinct set of predetermined frequencies including:

first means for converting the input signals into corresponding square wave signals, second means for providing four substantially square wave test signals per predetermined frequency having fundamental frequencies near said predetermined frequencies and providing four test signals at each said predetermined frequency equally displaced from one another in phase shift, third means coupled to said first means and said second means for measuring the proportion of time all of said test signals of each frequency and said input square wave signal are substantially in a predetermined phase relationship, fourth means for providing a standard value for separate subsets of said predetermined frequencies, and fifth means coupled to said third and fourth means for comparing said proportions of time with standard values.

* * * * *